United States Patent [19]

Detweiler

[11] Patent Number: 4,538,162

[45] Date of Patent: Aug. 27, 1985

[54] METHOD AND APPARATUS FOR LINE-AT-A-TIME PRINTING

[76] Inventor: Steven C. Detweiler, 1624 The Alemeda #32, San Jose, Calif. 95126

[21] Appl. No.: 432,255

[22] Filed: Jan. 21, 1983

[51] Int. Cl.[3] .............................................. G01D 15/06

[52] U.S. Cl. ...................................... 346/155; 346/162

[58] Field of Search ......... 346/1.1, 155, 156, 162–164, 346/139 C; 101/DIG. 13

[56] References Cited

U.S. PATENT DOCUMENTS 1,795,564 3/1931 Korge ............................ 346/163 X 3,414,723 12/1968 Pleitt et al. ..................... 346/156 X 4,385,306 5/1983 Conta ................................ 346/155

*Primary Examiner*—Thomas H. Tarcza

*Attorney, Agent, or Firm*—George W. Wasson

[57] ABSTRACT

A line-at-a-time printer for reproducing information in lines and rows of dots. The dots are produced by energizing wheels having peripheral spurs that produce dot marks on sheet stock passed between a printing drum element and a transferal drum. The information to be printed is scanned horizontally to energize spurs on individual wheels within the printing drum.

5 Claims, 5 Drawing Figures

FIG. 1
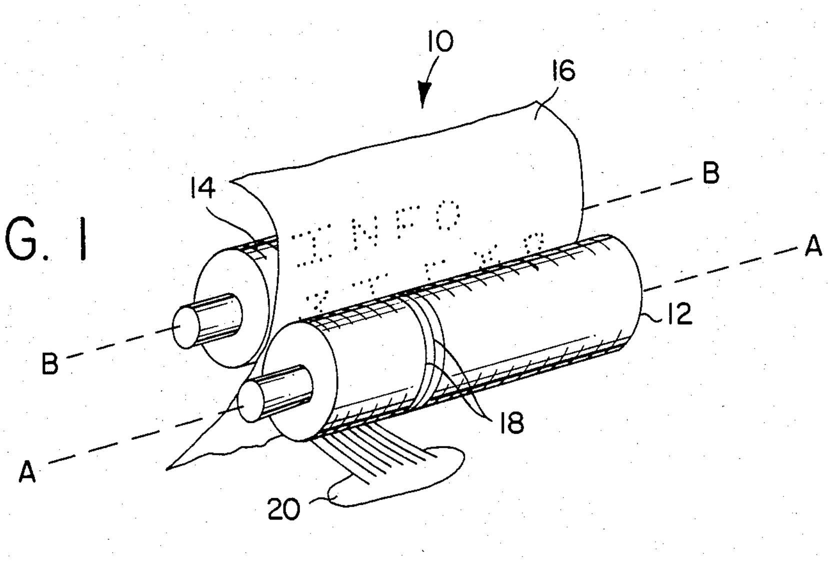
FIG. 2
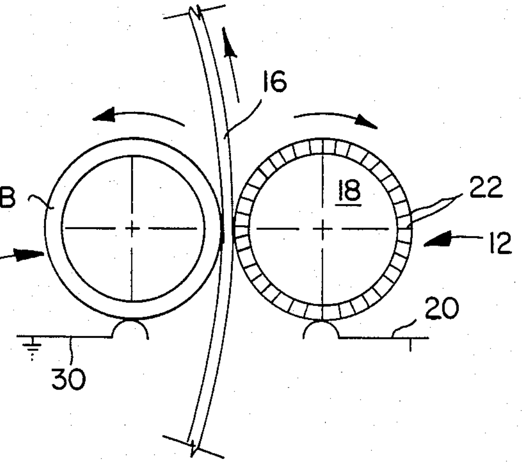
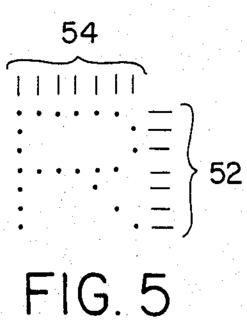
FIG. 5
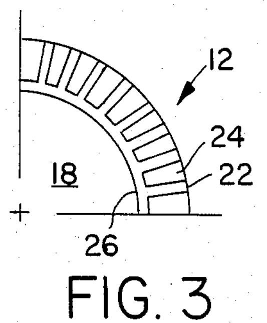
FIG. 3

METHOD AND APPARATUS FOR LINE-AT-A-TIME PRINTING

BACKGROUND OF THE INVENTION

This invention relates to a method and apparatus for high speed reproduction of graphic information.

In the art of reproducing graphic information there are known processes for reproducing individual whole characters one at a time as in conventional impact typewriters and moving dot matrix character reproducers that electrically reproduce individual characters from combined sets of horizontal and vertical dots. There also are impact dot matrix heads that reproduce single characters or lines of characters by hammering a set of rods against a reproduction sheet. This latter system is used to produce whole lines of print at one impact.

In those foregoing printers there is a time consumming process of either producing individual characters to produce one line or a hammering action to produce single characters or a line of characters. There is also a need for producing mechanical movement of a printer head or a set of rods to produce the desired impact. Both of the foregoing involves some friction contact with the surface being printed.

There is a need in high speed printing to reduce the time for producing the character reproduction and to smooth the movement of the paper stock with regard to the printing means. Such a need can be accomplished by reproducing entire lines of character reproduction on a reproduction stock which is moved at a uniform speed with regard to the printing means.

BRIEF DESCRIPTION OF THE INVENTION

In accord with the present invention, entire lines of characters or graphic information are reproduced by creating horizontal lines of dots across a stock with sets of dots in vertical rows combining to reproduce said characters of graphic information. The stock is moved in one direction (vertical) to align the rows of dots in the other direction (horizontal) while individual spur elements move with the stock to become aligned to produce discrete dots. The stock and the dot producing spur elements move in a smooth manner to reduce friction between each other and there are no mechanical hammering operations. The individual spur elements are energized in accord with horizontal scans of the characters or graphic information to produce the lines of dots across the stock, there being as many individual spur elements as are needed to produce the desired resolution of dots for reproduction.

The simplest form of producing the dots on the stock is by electrically charging the spurs and discharging the spurs through the stock to produce the desired mark. Other forms of marking can be employed such as ink-jet printing or laser marking.

The information to be printed is assembled in batches of entire lines with each line being then scanned in horizontal sweeps to produce the desired energization of the spur elements.

An object of the present invention is a high speed line-at-a-time printer for reproducing lines of characters or graphic information through sets of lines and rows of dots.

A further object of the present invention is a high speed printer in accord with the preceding object with few moving parts and with parts moving in rotary paths rather than oscillatory.

A further object is a method for high speed line-at-a-time printing by producing sets of horizontal lines of dots across a reproduction stock and sets of vertical rows of said dots to reproduce characters or graphic information.

Further objects and features of the present invention will be readily apparent to those skilled in the art from the appended drawings and specification illustrating a preferred embodiment wherein:

FIG. 1 is a perspective view showing apparatus for accomplishing the line-at-a-time printing of the present invention.

FIG. 2 is a cross-sectional view through the printing drum and transfer drum of FIG. 1.

FIG. 3 is an enlargement of a portion of one disk-like wheel of the printing drum of the present invention.

FIG. 5 illustrates an enlarged representation of a printed character produced in accord with the present invention.

DETAILED DESCRIPTION OF THE INVENTION

Figure 4:
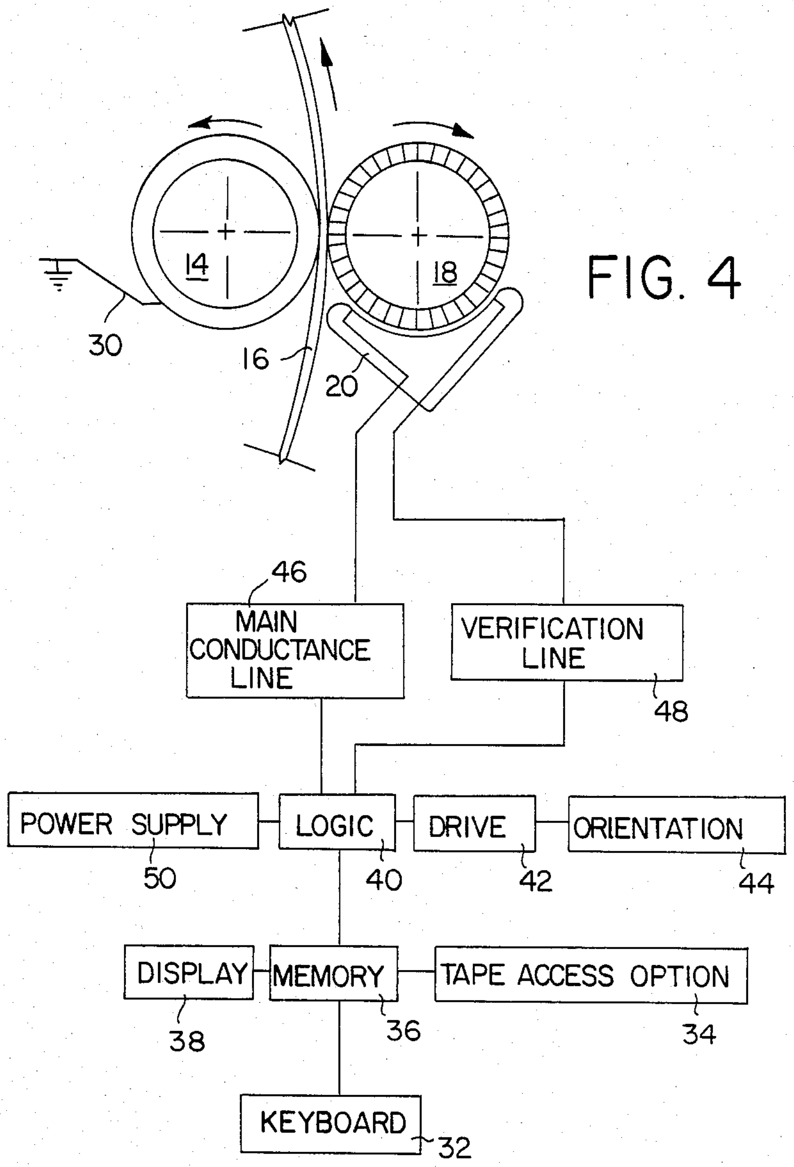
FIG. 4 is a block diagram of one form of energization scheme for the printing apparatus of the present invention.

The present invention is shown in perspective form in FIG. 1 wherein the printing apparatus 10 comprises a printing drum element 12 in the form of a cylinder-like structure rotatable about an axis A—A and a conducting transferal drum 14 in the form of a cylinder-like structure rotatable about an axis B—B. The two rotational axes are parallel. A sheet stock or similar material 16 is positioned between the two drums.

The printing drum 12 is assembled from individual disk-like wheels 18 each of which is insulated from its neighbor along the drum. Associated with each wheel 18 is an input energizer 20 which supplies input to the printing drum element.

FIG. 2 shows a sectional view through the printing drum element 12, the conducting transferal drum 14 and the sheet stock 16. As here illustrated, the disk-like wheel 18 is formed with a plurality of radial spurs 22 extending toward the periphery of the wheel. FIG. 3 shows more clearly the construction of the spurs 22 and their formation within the wheels 18. The spurs 22 are conducting material embedded in the insulating wheel 18 with the radial extremities of each spur being insulated from its neighbor by insulating material at 24. The inner radial end of each spur is connected to its neighbor within the wheel 18 by the annular band 26. Each wheel is insulated from its neighbor in the assembled printing drum by suitable insulating material. The spur extremities of each wheel are preferably aligned with spurs of the neighboring wheel so as to produce a line of spurs axially along the periphery of the printing drum.

An energizer 20 is shown in contact with one spur extremity in FIG. 2. Energization at any one spur energizes all spurs through the annular band 26.

FIG. 2 also shows the conducting transferal drum 14 and the sheet stock 16. The transferal drum 14 is a cylinder-like conductor with a continuous conductor exterior surface 28 and a circuit completing conductor 30 here shown as a grounded conductor. Energization of a spur 22 on a wheel 18 by energizer 20 causes current to flow through the spur in contact with the sheet stock 16 and into the transferal drum 14 at its exterior surface 28 and into conductor 30 to ground.

FIG. 4 illustrates in block diagram form the elements that are needed to energize the high speed printer of the present invention. Input information for the printer is supplied from alternate sources such as keyboard 32 or tape access option 34 which supply real time or stored information to a memory 36 and display 38. The memory provides a means for accumulating one or more lines or horizontal groupings of the information to be printed and the display provides a visible representation of the information in the memory. The memory information is supplied to a logic circuit 40 which scans the information in horizontal scans in accord with scan schedules supplied from drive circuit 42 in accord with orientation information from circuit 44.

The sequential energization signals from the logic 40 are supplied as pulses to a main conductance line 46 for each of the energizers 20 of an individual wheel 18 through the exterior ends of spurs 22 on each wheel. That energization causes the spur 22 then in contact with the sheet stock 16 to produce a current flow through the stock 16, to the conducting transferal drum 14 and to ground. A verification line circuit 48 synchronizes the energization and transfer of energization from the logic 40 to individual spurs 22 of each wheel 18. Power for the entire system and its elements is provided by power supply 50.

FIG. 50 illustrates the set of dots produced by the present invention in accomplishing the reproduction of stored information. As illustrated, the letter R is composed of a set of dots in horizontal lines 52 and in vertical rows 54. Each dot in a line 52 is produced by an energized spur on a separate wheel and each dot in a row 54 is produced by a different spur on an individual wheel. The horizontal lines of dots are produced across the entire width of the sheet stock as the wheels are energized. As the wheels are rotated about their common axis A—A (FIG. 1) and as the sheet stock 16 is moved between the printing drum 12 and the transferal drum 14, the rows for successive dots are established. The individual wheels 18 across the printing drum 12 may be energized in rapid sequence across the drum or all at once depending on the input supply of energization from logic 40. Lines of dots across the sheet stock are thus produced substantially instantaneously. As the next spur on a wheel comes into contact with the sheet stock, it is then ready for energization to produce a dot (or blank) in a row below the last printed dot.

While a certain preferred embodiment of the invention has been specifically disclosed, it should be understood that the invention is not limited thereto as many variations will be readily apparent to those skilled in the art and the invention is to be given its broadest possible interpretation within the terms of the following claims.

The subject matter to be claimed is:

1. A method of visibly reproducing stored or displayed graphic information on stock by producing individual horizontal scans of said information to develop sets of marks in horizontal and vertical combinations on said stock to duplicate said graphic information comprising, (a) producing a printing drum element extending across substantially the full width of the stock, said drum having a rotational axis and being composed of a plurality of coaxial individual disk-like wheels having radial spurs terminating in spur extremities around the circumference thereof, each radial extremity of a spur on a wheel being seperated from the neighboring spur on said wheel at said circumference and electrically connected to said neighboring spur and all other spurs within said wheel, each wheel being insulated from its neighbor wheel, (b) aligning said printing drum element with a conducting transferal drum having a rotational axis parallel to said rotational axis of said printing drum element, (c) positioning said stock between said printing drum element and said conducting transferal drum, (d) producing said individual horizontal scans of said information and individually energizing a spur of neighboring individual wheels axially along said printing drum element in accord with said horizontal scan, and causing said energized spur to mark said stock between said printing drum and said transferal drum, (e) repeating said individual horizontal scans of said information in parallel horizontal paths separated vertically along said graphic information while rotating said printing drum and transferal drum and moving said stock such that the plane of said stock moves parallel to said rotational axis of said printing drum and said transferal drum and in a direction corresponding to said separate horizontal scan paths, (f) and energizing said spurs on said printing drum element in accord with said stored or displayed graphic information.

2. In a high speed, line-at-a-time printer a method for producing individual horizontal portions of characters within said line comprising, (a) producing a disk-like element having equally spaced radial spurs at the periphery of said element, each spur being separated from its radial neighbor by insulating material, and all spurs being conductively connected radially within said element, (b) aligning a plurality of said disk-like elements to establish a printing drum extending across substantially the full width of a recording medium upon which said horizontal portions of characters are to be printed, said disk-like elements having their axis of rotation parallel to the horizontal axis of said line being printed, (c) electronically scanning horizontally said characters within said line, (d) energizing individual elements horizontally along said aligned plurality in accord with said horizontal scanning whereby individual radial spurs are energized by said horizontal scanning, (e) and rotating said drum comprising said plurality of disk-like elements, as a unit, in accord with successive spaced horizontal scans to produce said horizontal portions of characters within said line.

3. Apparatus for signal transfer from a horizontal scan of stored information to a line of dots on a reproduction surface comprising, (a) a printing drum having a cylinder-like exterior surface and an axis of rotation, (b) a transferal drum having a cylinder-like exterior surface and an axis of rotation, (c) said printing drum and said transferal drum being rotatable relative to each other about their axes with their axes parallel to each other, (d) said printing drum comprising a plurality of individual disk-like wheels, the center of each wheel being at said axis of rotation of said printing drum, each wheel insulated from its neighbor, said disk-like wheels having radial spurs around the circumference thereof, the radial extremity of each spur being separated from its neighbor at the circumference of said wheel, all of said spurs of a wheel being conductively connected within that wheel, each wheel of said plurality being aligned so as to align spur extremities on adjacent wheels along said cylinder-like exterior surface into a row of spurs, (e) separate means for energizing each of said wheels by contacting at least one radial extremity of said spurs on a wheel in response to said horizontal scan of said stored information, (f) said reproduction surface being positioned between said printing drum and said transferal drum with a row of spurs having at least electrical contact with said reproduction surface, (g) whereby a horizontal scan of said stored information energizes individual disk-like wheels in sequence horizontally along said printing drum by energizing said separate means in sequence at a spur of each wheel to energize a spur in said contact with said reproduction surface and aligned with said transferal drum thus producing a row of dots across said reproduction surface in accord with said horizontal scan, (h) and means for rotating said printing drum and said transferal drum and for advancing said reproduction surface in accord with vertical spaced sequence of said horizontal scans of said stored information to establish said line of dots on said reproduction surface.

4. The apparatus of claim 3 with the additional means for electronically energizing said wheels of said printing drum from electronically stored representations of said information.

5. The method of claim 1 wherein said stored or displayed graphics information is produced in a full horizontal line of information from an input means, then said information is scanned in said individual horizontal scans to energize said spurs of said printing drum to cause said spurs to mark said stock in horizontal rows across said stock and in vertical sets of rows to produce said reproduction of said information.

* * * * *